United States Patent [19]
Oberstein

[11] Patent Number: 6,028,553
[45] Date of Patent: *Feb. 22, 2000

[54] METHOD FOR DYNAMIC ROUTE RECOMMENDATION

[75] Inventor: Karla Oberstein, Munich, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,419

[22] Filed: Jun. 12, 1997

[30] Foreign Application Priority Data

Jun. 13, 1996 [DE] Germany .............................. 196 23 666

[51] Int. Cl.$^7$ ........................................................ G01S 3/02
[52] U.S. Cl. ....................................... 342/457; 342/357.13
[58] Field of Search ..................................... 342/457, 450, 342/357; 701/213

[56] References Cited

U.S. PATENT DOCUMENTS

| | | |
|---|---|---|
| 4,570,227 | 2/1986 | Tachi et al. . |
| 4,796,189 | 1/1989 | Nakayama et al. . |
| 4,962,458 | 10/1990 | Verstraete . |
| 5,023,798 | 6/1991 | Neukirchner et al. . |
| 5,272,638 | 12/1993 | Martin et al. . |
| 5,406,484 | 4/1995 | Wurzenberger . |
| 5,502,640 | 3/1996 | Yagyu et al. . |

FOREIGN PATENT DOCUMENTS

| | | |
|---|---|---|
| 0 021 060 | 1/1983 | European Pat. Off. . |
| 29 23 634 C2 | 1/1985 | Germany . |
| 41 39 581 A1 | 6/1993 | Germany . |
| 44 29 322 A2 | 2/1996 | Germany . |
| 195 19 066 A1 | 5/1996 | Germany . |
| WO 92/10808 | 6/1992 | WIPO . |
| WO 95/21435 | 8/1995 | WIPO . |

OTHER PUBLICATIONS

Zeitschrift für Eisenbahnwesen und Verkehrstechnik. Die Eisenbahn Technik + Glasers Annalen, vol. 120, No. 5, May (1996), Tomkewitsch, von R., "Verkehrsleitsysteme Für Den Motorisierten Individualverkehr Und Den Öffentlichen Verkehr Am Beispiel Von Euro Scout", (in German with Abstract in English), pp. 198–203.

Philips Journal of Research, vol. 48, No. 4, Jan. (1994), Biesterbos, J.W.M. et al, Socrates: A Dynamic Car Navigation, Driver Information and Fleet Management System, (in English), pp. 299–313.

Proceedings of the Navigation and Information Systems Conference, (1994), IEEE, Zijderhand, F. et al, "Functions and Applications of Socrates: A Dynamic In–Car Navigation System with Cellular–Radio Based Bi–Directional Communication Facility", (in English), pp. 543–546.

*Primary Examiner*—Thomas H. Tarcza
*Assistant Examiner*—Dao L. Phan
*Attorney, Agent, or Firm*—Hill & Simpson

[57] ABSTRACT

Using a mobile radiotelephone network and a traffic routing and information central as well as a navigation apparatus and a mobile radiotelephone in the vehicle, the user requests a current route in dialogue via a mobile radiotelephone network and a traffic routing and information central. The destination input ensues at any arbitrary location independently of a mobile radiotelephone connection to the central. The navigation apparatus initially calculates the route purely self-sufficiently on the basis of the stored on-board data. With an inquiry to the central, it is not the current position but the presumed position at the time of the anticipated reply to the vehicle that is transmitted, and the data of the route recommendation is forwarded to the vehicle in the form of a sequence of path segments.

5 Claims, 3 Drawing Sheets

METHOD FOR DYNAMIC ROUTE RECOMMENDATION

BACKGROUND OF THE INVENTION

The present invention is directed to a method for dynamic route recommendation in an inner city region for a vehicle with a self-sufficient navigation system based on a mobile radio service and a traffic routing and information center, whereby the vehicle has a navigation and mobile radio means.

What is meant by a "dynamic" route is a time-beneficial route that takes currently existing construction sites and traffic impediments into consideration as well as the current traffic situation. The method disclosed herein is applicable to the inner city region.

A number of vehicle navigation systems have been disclosed that are essentially self-sufficient navigation systems. That is, they have a data memory, a digitized street layout map on board. All geographic data on the basis whereof the route from a current position to a desired destination can be calculated and displayed for a car driver are stored on such a mass storage. A number of proposals have already been made for making this more dynamic. A known routing and information system provides a beacon system as infrastructure via which all dynamic route information are transmitted continuously in broadcast mode. Such a navigation system is disclosed by German Letters Patent 29 23 634. The disadvantage of this system, however, is that extremely high introduction costs are needed because of the required infrastructure.

For making route recommendations dynamic, it has already been proposed to employ the radio data system, RDS/TMC. The traffic message channel (TMC), however, is only composed of a very narrow data channel, so that only traffic events on the [freeway system] can be transmitted thereover for the foreseeable time; the channel capacity is too low for inner city information.

Another proposal for making route recommendations dynamic is based on the mobile radiotelephone network within the framework of a broadcast mode. All current changes compared to the information deposited in a data storage in the vehicle are thereby transmitted via the mobile radiotelephone network, for example changing travel times or all construction sites valid at the time. The vehicle device itself can then calculate the shortest route. However, an extremely high calculating capacity is needed in the vehicle device given this method. Further, there is a synchronization problem when a central that administers the dynamic data and the vehicle devices in the individual vehicles do not start at the same initial state of the digital map.

Over and above this, a dialogue system has been proposed via a mobile radiotelephone network. The driver has no self-sufficient database on board. Instead, the currently best route is transmitted to him as needed.

German Published Application DE-OS-1 95 19 066 discloses a method wherein a vehicle transmits a start and destination position to a traffic routing central via a mobile radiotelephone network, the central calculates the currently best route route management and communicates it to the vehicle via the mobile radiotelephone network. Further destination guidance ensues in the vehicle with navigation means carried along in the vehicle in the form of a digitized street map, a GPS receiver (global positioning system) and a computer, whereby data for route management modified due to a new traffic situation are communicated as needed to the vehicle via the mobile radiotelephone network.

However, these last two systems have problems in the inner city region, namely time shifts arise between traveling or leaving the recommended route and subsequent rephase-in. A certain time during which the vehicle continues to move can pass anyway between inquiry and reply from a central location. The position at the time of the inquiry thus no longer coincides with the position at the time of the reply. In an inner city network, which has very dense street patterns, the vehicle can be located on one of several outbound streets. Contact with a central location is necessary in order to obtain coordinates of a destination. This, however, is not necessarily established at every position. The driver must then wait until such contact has been made.

Numerous methods are known in the prior art for calculating a route from a starting point to a destination point. One skilled in the art would readily know how to perform such calculations from, for example, U.S. Pat. Nos. 4,962,458; 4,570,227; 4,796,189; 5,272,638; 5,502,640; and 5,023,798. These patents are hereby incorporated by reference in order to provide for calculation of a first course route recommendation from a current position to the destination, and for calculating a presumed position of the vehicle after the predetermined period of time, and for calculating a second updated route recommendation from the presumed position to the destination.

SUMMARY OF THE INVENTION

It is an object of the present invention to provide a self-sufficient navigation system using a mobile radiotelephone network and traffic routing and information central such that a dynamic route guidance is possible from the vehicle position to a destination that has been input. Even when the recommended route is intentionally or unintentionally left, the driver of the vehicle is guided automatically onto a dynamically beneficial route insofar as possible.

In the inventive method, the user with the navigation means requests a current route in dialogue via a mobile radiotelephone interface over a mobile radiotelephone network, for example GSM (Groupe Special Mobile) and a traffic routing and information computer. The destination input thereby ensues at any arbitrary location independently of a mobile radiotelephone connection. Subsequently, the self-sufficient navigation means calculates the route on the basis of the stored onboard data. With an inquiry to the central, it is not the current but the presumed position at the time of the anticipated reply to the vehicle that is transmitted. The data of the route recommendation is sent to the vehicle in the form of a sequence of path segments.

In a further development of the inventive method, the version number of the data stored in the mass storage of the on-board means is transmitted to the central together with the route inquiry. Further, the entire sequence of path segments up to the anticipated arrival of the reply is co-transmitted. In the central, the current data version is compared to the received version. In case of an earlier version number, the central transmits specific, lacking street segment data to the vehicle and a reference signal that informs the driver of the lack of the current version.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
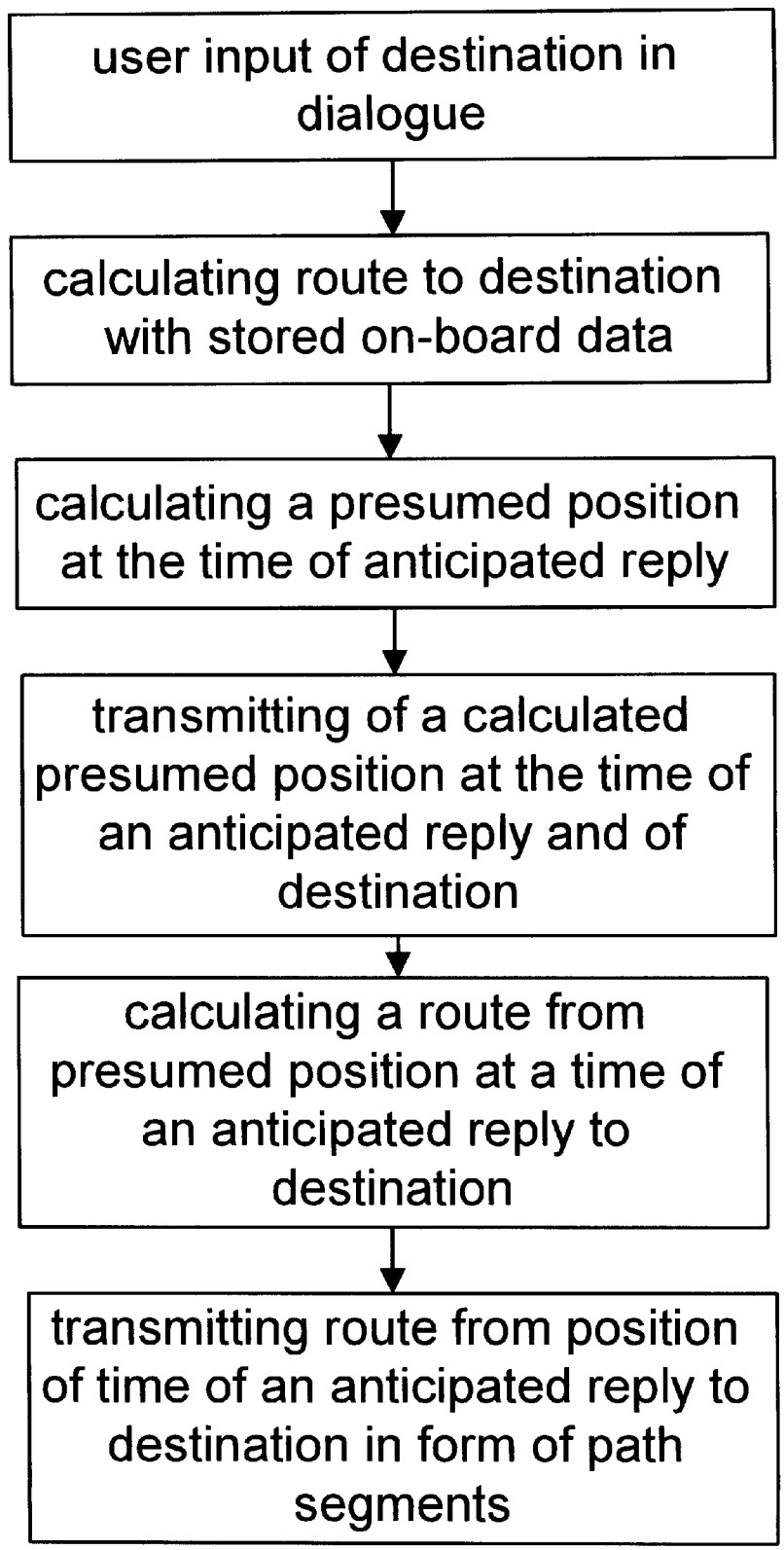
FIG. 1 is a flowchart depicting the steps of the method of the present invention.
Figure 2:
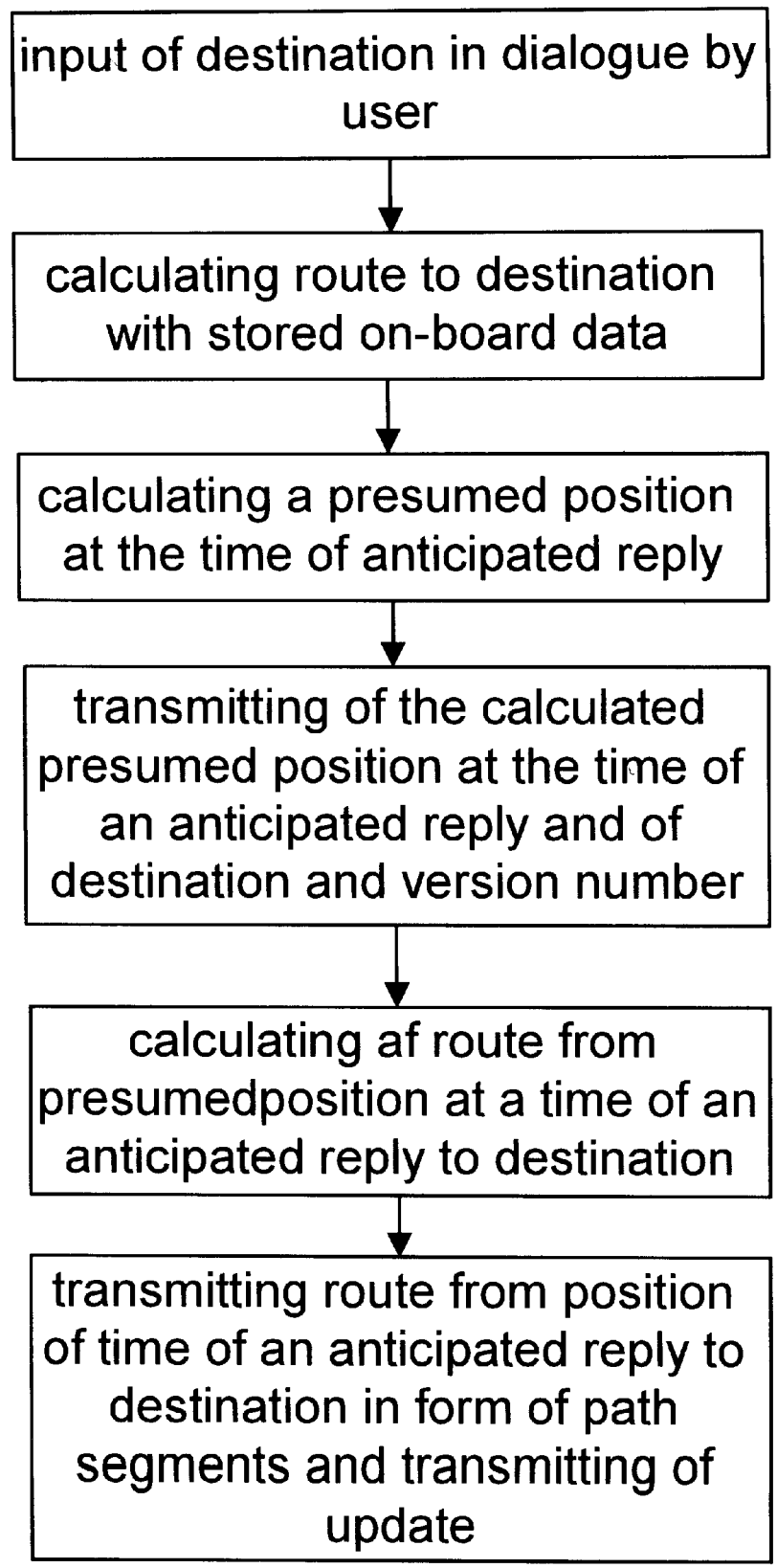
FIG. 2 is another flowchart depicting the steps of the method of the present invention.
Figure 3:
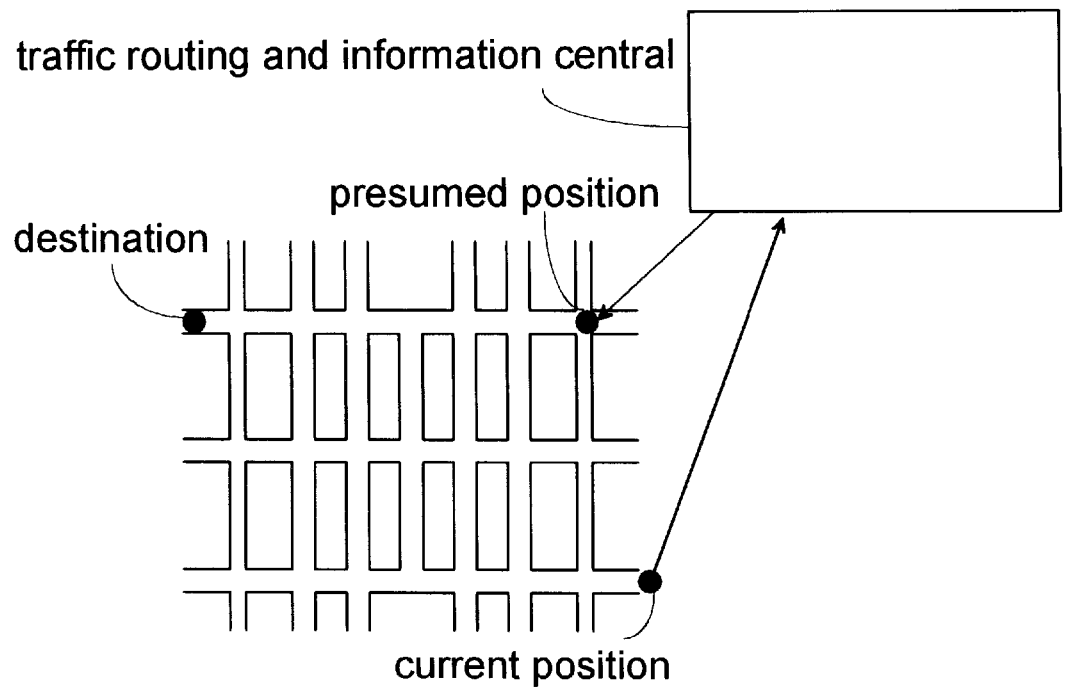
FIG. 3 depicts the traffic routing information center and presumed in current positions.
Figure 4:
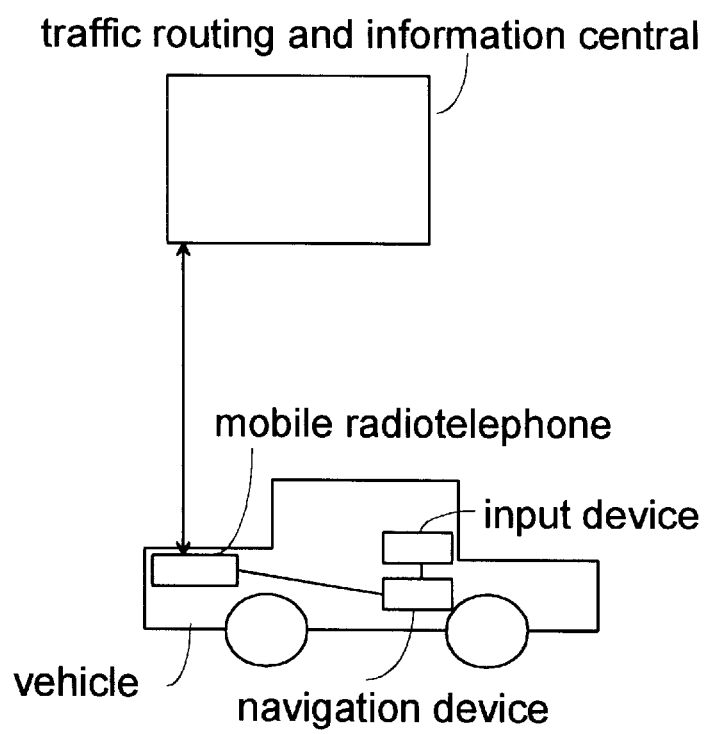
FIG. 4 depicts the navigation device within a vehicle, the navigation device being linked to the traffic routing and information central.

The present invention is a method for dynamic route recommendation in an inner-city region for a vehicle with a self-sufficient navigation system using a mobile radio telephone network and using a traffic routing and information central. The vehicle has a navigation device and a mobile radiotelephone. FIGS. 1 and 2 depict steps in the method of the present invention as will be described below. FIG. 3 shows a current position of a vehicle and its destination, as well as, the presumed position by the traffic routing and information central. FIG. 4 depicts the linking of the traffic routing information central to the mobile radiotelephone in the vehicle. FIG. 4 also shows the vehicle having an input device and a navigation device.

The inventive method uses a self-sufficient navigation system in combination with a GSM interface via which a current route can be requested in dialogue. This inventive method has both the advantage of a GSM dialogue-protected method, that is, no initial capital costs in the infrastructure, no synchronization problems with different databases in the central (central location) and in the vehicles, as well as the advantage of a self-sufficient navigation method, namely of being independent of a current connection to a central. Moreover, the beginning of a journey and the potential departure from a predetermined route and subsequent rephase-in take on a simpler form.

The destination input in this method can ensue at any arbitrary location, even when there is no connection to a central via the mobile radiotelephone network, for example in an underground garage. In the inventive method, only local components in the vehicle are accessed. Subsequently, the self-sufficient navigation system can calculate the route to the desired destination, purely self-sufficiently on the basis of the data stored on board. It is then not the current position but the presumed position at the time of the anticipated reply (in a standard way in the form of the number of a path segment or in some other type of encoding) that is transmitted to the central with an inquiry via the mobile radiotelephone network. The central then calculates the route only from exactly one starting point to the destination and no longer from a plurality of possible starting points. The same thing is repeated as soon as a driver intentionally or mistakenly leaves his recommended route and wishes to be phased back in. Since the self-sufficient navigation device only has static data available, a route could be currently blocked due to current conditions, for example due to a construction site, whereby this route can be located between the starting position of the vehicle and the position for the anticipated reply. Given this unfavorable situation, it can then occur that the driver no longer arrives on the route segment planned by the self-sufficient navigation device. Another possibility that can lead to problems can be established in that the self-sufficient navigation device exhibits a different version status from the central. That is, the vehicle still has an earlier version status. It can thereby occur that a part of a street is not longer present as passable.

In order to avoid this, the version number of the data in the mass storage of the vehicle is co-transmitted to the central and the entire sequence of path segments up to the anticipated arrival of the reply. The central can then check whether it is possible to travel over the indicated path segment at the time. When the central finds that it is not possible to travel over the planned path segments, then, as in the case of a pure GSM-supported dialogue system without mass storage on board, it must calculate the route of a plurality of possible path segments. A route recommendation is output to the vehicle as data. This is generally a sequence of path segments. These path segments can be handed over as numbers of individual path segments or as codes of street names.

Upon output of the data, a check is carried out to see whether the version number of the data in the central and in the vehicle agree and whether the vehicle already has the most current version of the data. If the vehicle has an earlier version, then certain path segments may not yet exist in the old data. These must then be described in full detail, for example length and direction of the individual vectors, potentially required display or voice outputs.

In general, a driver can be provided with a message as soon as inconsistencies occur. It can be pointed out to him that he would probably have fewer problems with a new map base on board. Special handling in the case of unsynchronized data, namely, also means increased communication costs.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for dynamic route recommendation, for vehicles utilizing a traffic routing and information central and a mobile radiotelephone network for communication of said central with said vehicles, the vehicles being equipped with a navigation system, in which data is stored, which includes routes between several current positions and destinations and the vehicles being equipped as well with mobile radiotelephones sending a question to the traffic routing and information central and for receiving a response after a predetermined period of time, the method comprising the steps of:

inputting a destination in the navigation system;

providing a first course route recommendation from a current position to the destination by the navigation system;

providing a presumed position of the vehicle after the predetermined period of time by the navigation system, provided the vehicle starts immediately and follows the first route recommendation for the predetermined period of time;

transmitting the presumed position and the destination to the traffic routing and information central via the mobile radiotelephone;

providing a second updated route recommendation from the presumed position to the destination by the traffic routing and information central based on actual traffic data stored in the traffic routing and information central; and transmitting the second route recommendation to the vehicle via the mobile radiotelephone.

2. The method according to claim 1, wherein a version number of data stored in a mass storage of an on-board device is transmitted to the central together with the current route request, as is an entire sequence of path segments up to the anticipated arrival of the reply and are compared therein to a received version; and wherein, for an earlier version number, the central transmits specific, lacking street segment data and a reference signal to the vehicle, whereby the deficiencies of the current version are indicated.

3. A method for dynamic route recommendation in an inner city region for a vehicle with a self-sufficient navigation system using a mobile radiotelephone network and using a traffic routing and information central, comprising the steps of:

providing stored on-board data in the vehicle;

providing a navigation device and a mobile radiotelephone device in the vehicle;

requesting by a user in the vehicle a current route using the navigation device in dialogue via a mobile radiotelephone interface via a mobile radiotelephone network and its traffic routing and information central;

providing a destination input at any arbitrary location of the vehicle independently of a mobile radiotelephone connection to the central;

calculating via the navigation device a route to the destination based on the stored on-board data;

transmitting to the central a calculated, presumed position at a time of an anticipated reply to the vehicle to the central with an inquiry instead of a current position; and forwarding data of a recommended route from the central to the vehicle in the form of a sequence of path segments.

4. The method according to claim 3, wherein a version number of the stored on-board data is transmitted to the central together with the current route request, as is an entire sequence of path segments up to the anticipated arrival of a reply and are compared therein to a received version; and wherein for an earlier version number, the central transmits specific, lacking street segment data and a reference signal to the vehicle, whereby deficiencies of the current version are indicated.

5. A method for dynamic route recommendation in an inner city region for a vehicle with a self-sufficient navigation system using a mobile radiotelephone network and using a traffic routing and information central, comprising the steps of:

providing stored on-board data in the vehicle;

providing a navigation device and a mobile radiotelephone device in the vehicle;

requesting by a user in the vehicle a current route using the navigation device in dialogue via a mobile radiotelephone interface via a mobile radiotelephone network and its traffic routing and information central and transmitting to the central a version number of the stored on-board data, the current route request, a sequence of path segments up to an anticipated arrival of a reply;

providing a destination input at any arbitrary location of the vehicle independently of a mobile radiotelephone connection to the central;

calculating via the navigation device a route to the destination based on the stored on-board data;

transmitting to the central a new version number and a calculated, presumed position at a time of an anticipated reply to the vehicle with an inquiry instead of a current position; and forwarding data of a recommended route and a new version number to the vehicle in the form of a sequence of path segments, for an earlier version number, the central transmits specific, lacking street segment data and a reference signal to the vehicle, whereby deficiencies of the current version are indicated.

* * * * *